United States Patent
Senoo

(10) Patent No.: US 9,997,967 B2
(45) Date of Patent: Jun. 12, 2018

(54) ROTOR OF ELECTRIC MOTOR WHICH HAS MAGNETS, ELECTRIC MOTOR, AND METHOD OF PRODUCTION OF ROTOR

(71) Applicant: FANUC CORPORATION, Yamanashi (JP)

(72) Inventor: Tatsuya Senoo, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 415 days.

(21) Appl. No.: 14/574,799

(22) Filed: Dec. 18, 2014

(65) Prior Publication Data
US 2015/0180291 A1    Jun. 25, 2015

(30) Foreign Application Priority Data
Dec. 20, 2013    (JP) .................................. 2013-264378

(51) Int. Cl.
*H02K 1/27* (2006.01)
*H02K 15/03* (2006.01)

(52) U.S. Cl.
CPC ........... *H02K 1/274* (2013.01); *H02K 1/2773* (2013.01); *H02K 15/03* (2013.01); *Y10T 29/49012* (2015.01)

(58) Field of Classification Search
CPC ...... H02K 1/273; H02K 1/2776; H02K 12/21; H02K 1/274; H02K 1/2773; H02K 15/03; Y10T 29/49012
USPC ..... 310/156.53, 156.58, 156.57; 29/596–598
See application file for complete search history.

(56) References Cited

U.S. PATENT DOCUMENTS

| | | | | |
|---|---|---|---|---|
| 4,954,736 A * | 9/1990 | Kawamoto | ............ | H02K 1/278 310/156.21 |
| 5,397,951 A * | 3/1995 | Uchida | .................. | H02K 1/278 310/156.21 |
| 8,203,245 B2 * | 6/2012 | Ishikawa | ................ | H02K 1/278 310/156.08 |

(Continued)

FOREIGN PATENT DOCUMENTS

| CN | 1725601 A | 1/2006 |
|---|---|---|
| JP | 2004023944 A | 1/2004 |

(Continued)

OTHER PUBLICATIONS

English Machine Translation of Abstract for Japanese Publication No. 2012044789 published Mar. 1, 2012, 1 page.
English Machine Translation of Japanese Publication No. 2011135735 published Jul. 7, 2011, 23 pages.
English Machine Translation of Japanese Publication No. 2011101491 published May 19, 2011, 15 pages.
English Machine Translation of Japanese Publication No. 2011062078 published Mar. 24, 2011, 21 pages.
English Machine Translation of Abstract for Japanese Publication No. 2009268263 published Nov. 12, 2009, 1 page.
English Machine Translation of Abstract for Japanese Publication No. 2008141799 published Jun. 19, 2008, 1 page.
English Machine Translation of Japanese Publication No. 2005065417 published Mar. 10, 2005, 15 pages.

(Continued)

*Primary Examiner* — Joshua Benitez Rosario
*Assistant Examiner* — Leda Pham
(74) *Attorney, Agent, or Firm* — Fredrikson & Byron, P.A.

(57) ABSTRACT

In the rotor of the present invention, each magnet has an inward part adjoining the rotor core and an outward part positioned outward of the inward part in a radial direction of the rotor core. The outward has a facing surface which faces a stator and a pair of side surfaces which extend from two end parts of the facing surface in a circumferential direction toward the inward part. The inward part has a pair of overhanging parts which overhangs outward in the circumferential direction with respect to the pair of side surfaces of the outward part. Each locking projection of the rotor core passes between overhanging parts of two adjoining magnets and projects outward in the radial direction to engage with the overhanging parts.

1 Claim, 6 Drawing Sheets

(56) References Cited

U.S. PATENT DOCUMENTS

| | | | |
|---|---|---|---|
| 8,598,762 B2 * | 12/2013 | Nakano | H02K 1/278 310/156.28 |
| 2006/0017342 A1 * | 1/2006 | Park | H02K 1/278 310/156.19 |

FOREIGN PATENT DOCUMENTS

| | | | |
|---|---|---|---|
| JP | 2005020892 | A | 1/2005 |
| JP | 2005065417 | A | 3/2005 |
| JP | 2008141799 | A | 6/2008 |
| JP | 2009268263 | A | 11/2009 |
| JP | 2011062078 | A | 3/2011 |
| JP | 2011101491 | A | 5/2011 |
| JP | 2011135735 | A | 7/2011 |
| JP | 2012044789 | A | 3/2012 |
| JP | 5082534 | B | 11/2012 |

OTHER PUBLICATIONS

English Machine Translation of Abstract for Japanese Publication No. 2005020892 published Jan. 20, 2005, 1 page.
English Machine Translation of Japanese Publication No. 2004023944 published Jan. 22, 2004, 9 pages.
English abstract for Japanese Publication No. JP5082534 B2, published Nov. 28, 2012, 2 pages.
English Abstract and Machine Translation for Chinese Publication No. 1725601 A, published Jan. 25, 2006, 5 pgs.

* cited by examiner

ROTOR OF ELECTRIC MOTOR WHICH HAS MAGNETS, ELECTRIC MOTOR, AND METHOD OF PRODUCTION OF ROTOR

BACKGROUND OF THE INVENTION

1. Field of the Invention

The present invention relates to a rotor of an electric motor which has magnets, an electric motor, and a method of production of a rotor of an electric motor.

2. Description of the Related Art

In general, an electric motor of a type which attaches permanent magnets to the surface of a rotor core is called an SPM (surface permanent magnet) motor. The permanent magnets of an SPM motor are acted on by the centrifugal force due to the rotational motion of the rotor and the attraction force due to the magnetic force of the stator outward in the radial direction. For this reason, to prevent the permanent magnets from flying off due to operation of the SPM motor, a fastening method which fastens the permanent magnets to withstand the above centrifugal force and attraction force has been sought. In many cases, the permanent magnets of the SPM motor are bonded by a binder, for example, an epoxy resin, to the rotor core. However, the bond strength by the binder is not necessarily sufficient, so it is necessary to limit the output torque of the motor so that the above centrifugal force and attraction force are kept down.

As another fastening method of permanent magnets, Japanese Patent No. 5082534 proposes a method comprising forming a plurality of holding projections with T-shaped cross-sections vertical to the axis of rotation of the rotor in the circumferential direction of the rotor core and arranging permanent magnets between the adjoining holding projections so as to lock the two end parts of the permanent magnets. However, in the method of Japanese Patent No. 5082534, if reducing the curvature rates of the permanent magnets so as to realize a larger torque, since the holding projections project outward in the radial direction from the surfaces of the permanent magnets, there is the danger of the holding projections contacting the stator. On the other hand, if increasing the distance between the stator and rotor so as to prevent contact of the two, the result is that the magnetic gap becomes larger, so the output torque of the motor can fall. Further, the holding projections of Japanese Patent No. 508253 are magnetic bodies which are formed integrally with the rotor core and can absorb the magnetic flux of the permanent magnets, so the magnetic flux near the holding projections can short-circuit regardless of the stator. As a result, the magnetic flux density of the motor decreases and the output torque falls.

A rotor of an electric motor which reliably fastens the magnets to the rotor core and which prevents a drop in the output torque has been sought.

SUMMARY OF THE INVENTION

According to a first aspect of the present invention, there is provided a rotor of an electric motor which is provided with a cylindrically shaped rotor core, and a plurality of magnets which are arranged at predetermined intervals at an outer circumferential surface of the rotor core, wherein each of the plurality of magnets has an inward part which adjoins the rotor core and an outward part which is positioned outward of the inward part in a radial direction of the rotor core, the outward part has a facing surface which faces a stator of the electric motor and a pair of side surfaces which extend from two end parts of the facing surface in a circumferential direction of the rotor core toward the inward part, the inward part has a pair of overhanging parts which overhang outward in the circumferential direction with respect to the pair of side surfaces of the outward part, the rotor core has a plurality of locking projections which are formed at the outer circumferential surface so as to lock the plurality of magnets, and each of the plurality of locking projections has a radially projecting part which passes between the overhanging parts of two adjoining magnets and projects outward in the radial direction to engage with the overhanging parts.

According to a second aspect of the invention, there is provided a rotor of an electric motor of the first aspect wherein the locking projections are formed to extend across the entire length of the rotor core in directions parallel to an axis of rotation of the rotor core.

According to a third aspect of the invention, there is provided a rotor of an electric motor of the first aspect wherein the rotor core has first locking projections which are aligned with one another, and second locking projections which are aligned with one another and separated from the first locking projections in a direction parallel to the axis of rotation of the rotor core, as said locking projections, one end part of the overhanging part in a direction parallel to the axis of rotation is locked by the first locking projection, and the other end part of the overhanging part is locked by the second locking projection.

According to a fourth aspect of the invention, there is provided a rotor of an electric motor of any of the first to third aspects wherein a clearance is formed between the overhanging part and the locking projection, and the rotor is further provided with a binding agent which is filled in the clearance.

According to a fifth aspect of the invention, there is provided a rotor of an electric motor of any of the first to fourth aspects wherein tip parts of the locking projections are positioned inward of the facing surfaces of the magnets in the radial direction.

According to a sixth aspect of the invention, there is provided an electric motor which is provided with the rotor according to any one of the first to fifth aspects.

According to a seventh aspect of the invention, there is provided a method of production of the rotor of an electric motor according to the third aspect comprising slanting the magnet with respect to the axis of rotation and in that state inserting one end part of the overhanging part of the magnet in a space between the first locking projection and the outer circumferential surface of the rotor core, arranging the magnet in parallel with the axis of rotation, inserting the other end part of the overhanging part of the magnet in a space between the second locking projection and the outer circumferential surface of the rotor core, and filling a binding agent in clearances between the overhanging part of the magnet, and the first and second locking projections.

These and other objects, features, and advantages of the present invention will become clearer with reference to the detailed description of illustrative embodiments of the present invention which are shown in the attached drawings.

DETAILED DESCRIPTION OF EMBODIMENTS

Below, embodiments of the present invention will be explained in detail with reference to the drawings. Note that the following explanation does not limit the technical scope of the inventions which are described in the claims or the meaning of terms etc.

Figure 1:
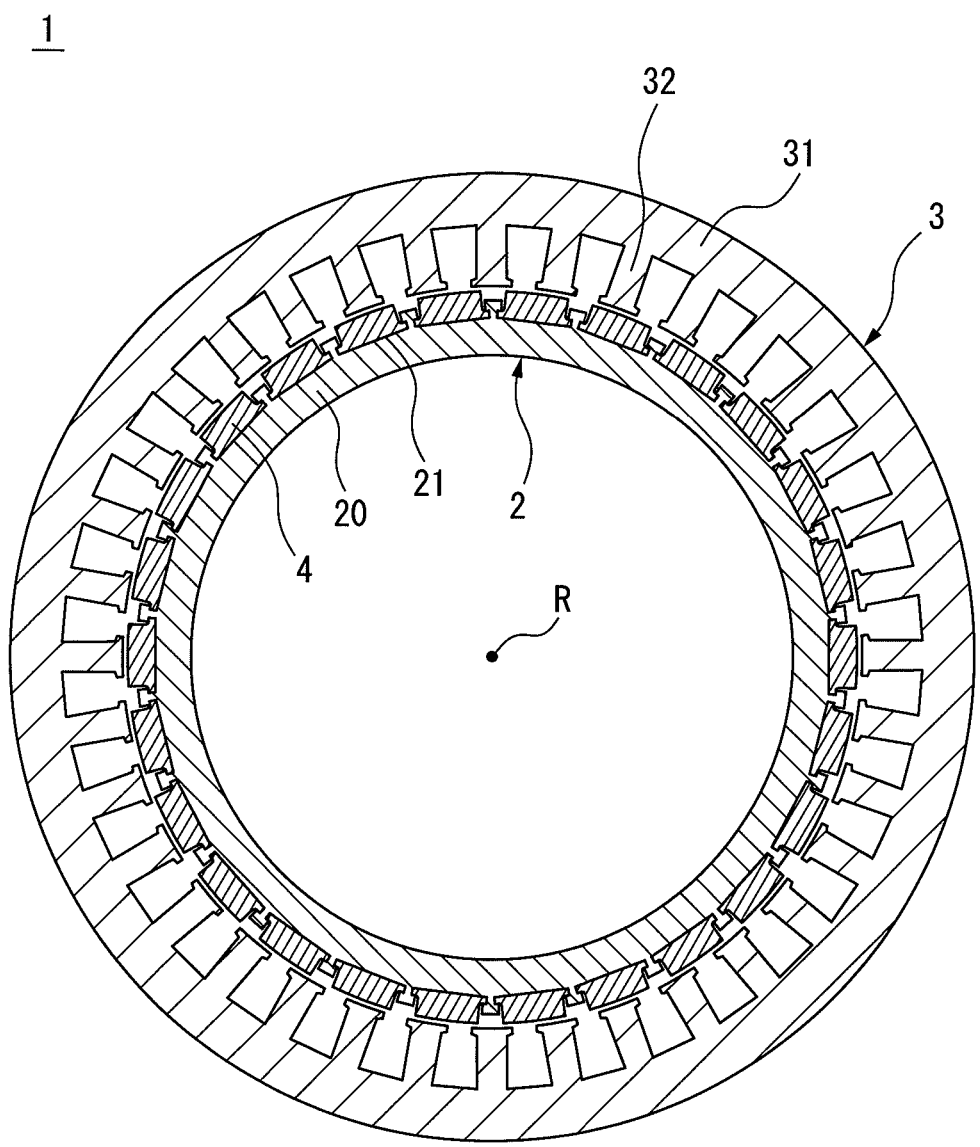
FIG. 1 is a cross-sectional view of an electric motor which is provided with a rotor of a first embodiment of the present invention.

First, referring to FIG. 1 to FIG. 6, an electric motor which is provided with a rotor of a first embodiment of the present invention will be explained. The electric motor which is provided with the rotor of the present embodiment is an electric motor which generates drive force by cooperation of a rotor and a stator. More specifically, it is an SPM motor which has a structure where permanent magnets are arranged at the outer circumferential surface of a rotor core. FIG. 1 is a cross-sectional view of an electric motor 1 which is provided with an illustrative rotor 2 of the present embodiment. As shown in FIG. 1, the electric motor 1 is provided with a rotor 2 which makes a rotational movement about a predetermined axis of rotation R and a stator 3 which is arranged concentrically with the rotor 2 so as to surround the rotor 2. The stator 3 according to the present embodiment has a cylindrically shaped yoke part 31 and a plurality of teeth 32 which project out from the yoke part 31 toward the rotor 2. These teeth 32 have stator winding wires (not shown) which are wound around them. The yoke part 31 and plurality of teeth 32 can be formed integrally by stacking electrical steel sheets.

Figure 2:
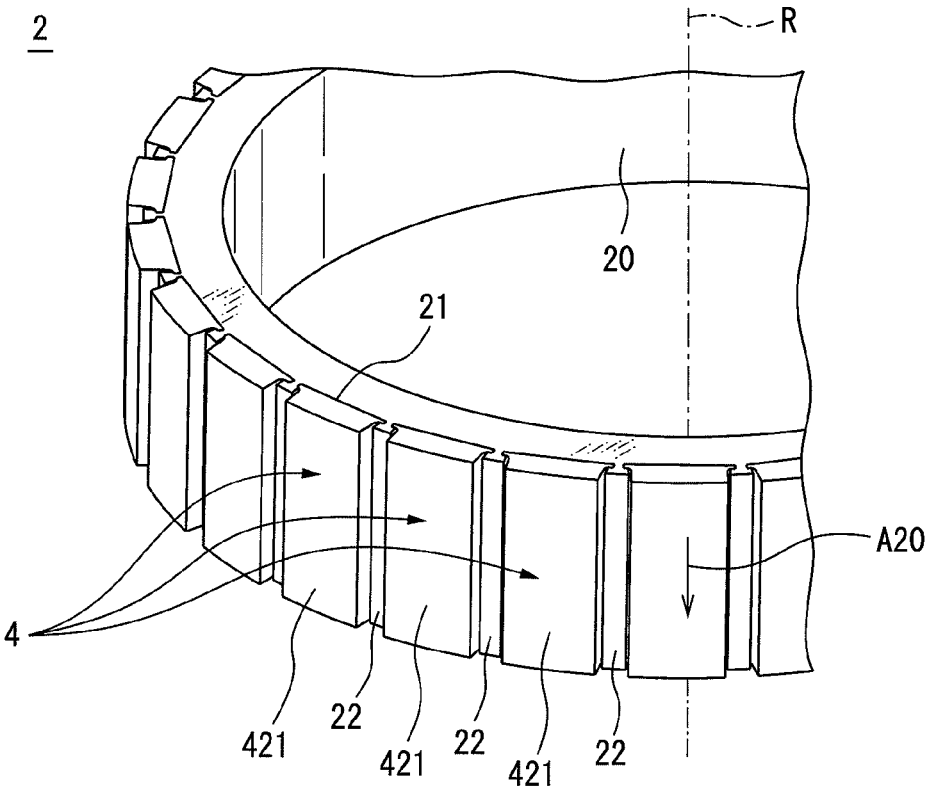
FIG. 2 is a perspective view of the rotor in the electric motor of FIG. 1.
Figure 3:
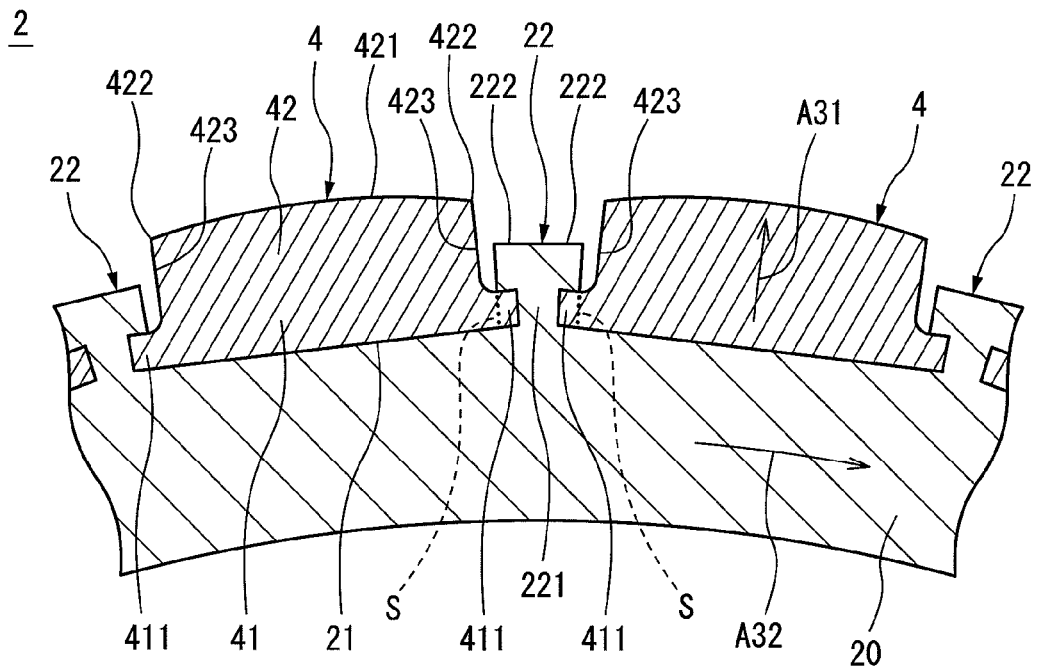
FIG. 3 is a cross-sectional view which shows part of the rotor in the electric motor of FIG. 1 enlarged.

FIG. 2 is a perspective view of a rotor 2 in the electric motor 1 of FIG. 1. As shown in FIG. 1 and FIG. 2, the rotor 2 of the present embodiment has a cylindrically shaped rotor core 20 and a plurality of magnets 4 which are arranged at the outer circumferential surface 21 of the rotor core 20 at predetermined intervals. More specifically, the rotor 2 according to the present embodiment has 26 magnets 4 which are arranged at equal intervals in the circumferential direction of the rotor core 20. The magnets 4 according to the present embodiment are neodymium magnets or ferrite magnets or other permanent magnets. FIG. 3 is a cross-sectional view which shows part of the rotor 2 in the electric motor 1 of FIG. 1 enlarged. As shown in FIG. 3, each magnet 4 of the present embodiment has an inward part 41 which is arranged adjoining the outer circumferential surface 21 of the rotor core 20, and an outward part 42 which is positioned outward from the inward part 41 in the radial direction of the rotor core 20. Below, the radial direction of the rotor core 20 which is shown by the arrow mark A31 will be simply referred to as the "radial direction", while the circumferential direction of the rotor core 20 which is shown by the arrow mark A32 will be simply referred to as the "circumferential direction".

Figure 4:
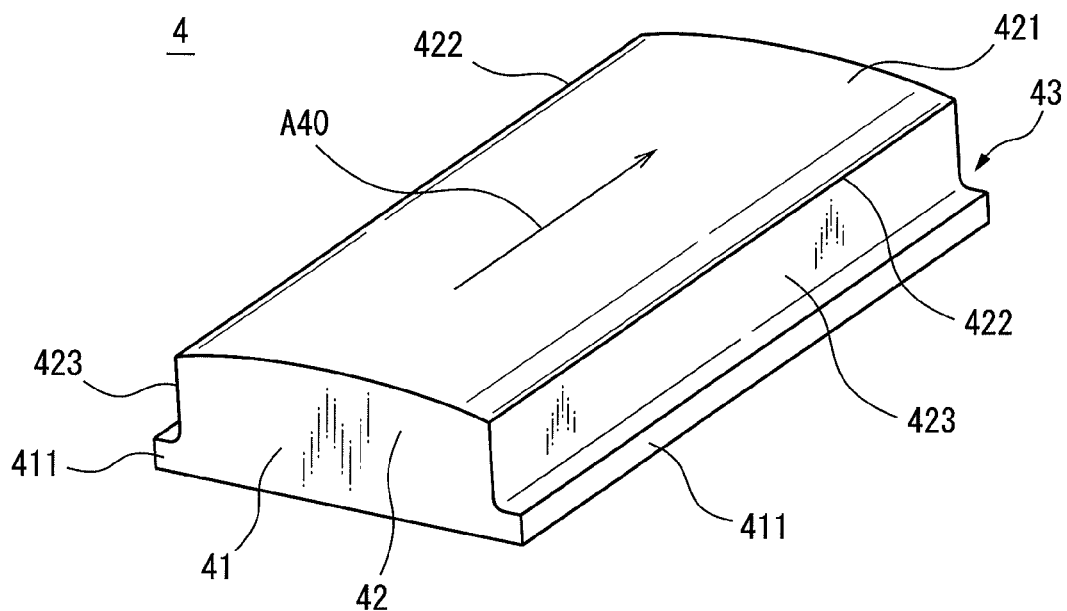
FIG. 4 is a perspective view of a magnet in the electric motor of FIG. 1.

FIG. 4 is a perspective view of one magnet 4 at the rotor 2 of FIG. 3. As shown in FIG. 3 and FIG. 4, the outward part 42 of the magnet 4 of the present embodiment has a facing surface 421 which faces the inner circumferential surface of the stator 3 and a pair of side surfaces 423 and 423 which extend from the two end parts 422 and 422 in the circumferential direction of the facing surface 421 toward the inward part 41. The facing surface 421 of the magnet 4 according to the present embodiment can be worked to a curved shape which has a curvature corresponding to the inner circumferential surface of the stator 3. Due to this, a cogging torque of the electric motor 1 can be lightened. Further, the facing surface 421 and the side surfaces 423 of the magnet 4 cross at the corresponding end parts 422 to form predetermined angles. Further, the inward part 41 of the magnet 4 has a pair of overhanging parts 411 and 411 which overhang outward in the circumferential direction with respect to the pair of side surfaces 423 and 423 of the outward part 42. The dimension of the inward part 41 at the magnet 4 in the circumferential direction in this way becomes larger than the dimension of the outward part 42 in the circumferential direction. Therefore, the outer end surface 43 of the magnet 4 in the circumferential direction has a stepped shape as a whole due to the differences in dimensions of the inward part 41 and the outward part 42.

Figure 5:
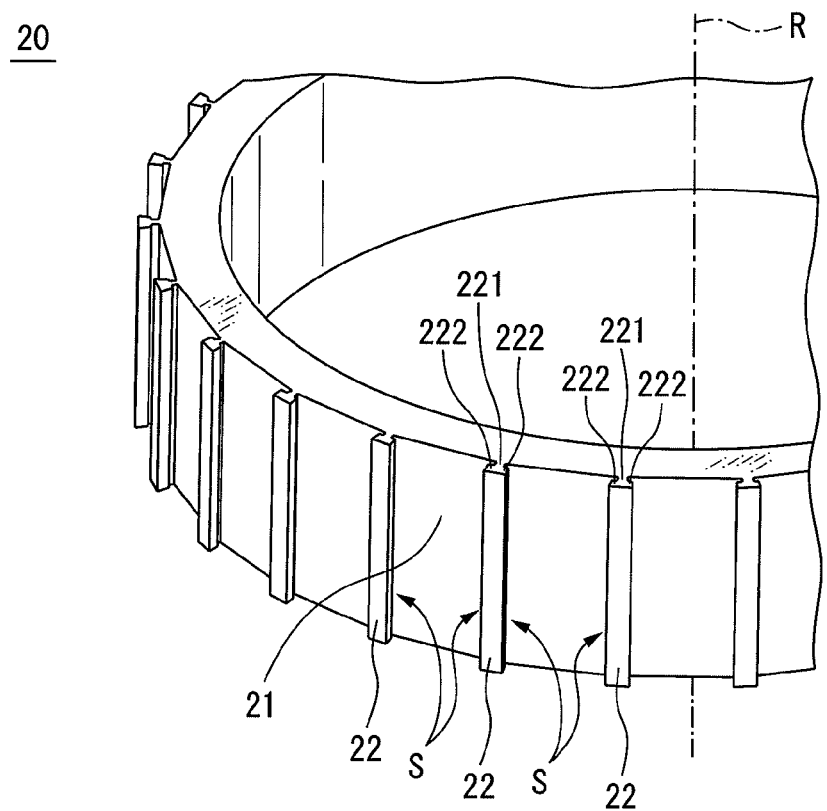
FIG. 5 is a perspective view of a rotor core in the electric motor of FIG. 1.

Referring to FIG. 2 and FIG. 3, the rotor core 20 according to the present embodiment has a plurality of locking projections 22 which project outward in the radial direction from the outer circumferential surface 21 so as to lock the plurality of magnets 4. More specifically, a plurality of locking projections 22 are arranged at equal intervals along the circumferential direction. Each of the locking projection 22 has a radially projecting part 221 which projects outward in the radial direction from the outer circumferential surface 21 of the rotor core 20. Further, the tip part of the radially projecting part 221 is provided with a pair of engagement parts 222, 222 which project outward in the circumferential direction so as to engage with the overhanging parts 411 of the magnets 4. As shown in FIG. 3, the radially projecting part 221 of the locking projection 22 projects from the rotor core 20 of the outer circumferential surface 21 in the radial direction so as to pass between the overhanging parts 411 of two adjoining magnets 4. Further, the pair of engagement parts 222, 222 project out in the circumferential direction toward the side surfaces 423 of two adjoining magnets 4. FIG. 5 is a perspective view of a rotor core 20 in the electric motor 1 of FIG. 1. As shown in FIG. 3 and FIG. 5, the locking projection 22 of the rotor core 20 has a T-shape in a cross-section vertical to the axis of rotation R, while the two end parts of the locking projection 22 in the circumferential direction are provided with groove-shaped spaces S which extend parallel to the axis of rotation R.

Referring to FIG. 3, in the rotor 2 according to the present embodiment, the overhanging parts 411 of the magnet 4 are arranged in the groove-shaped spaces S so as to engage with the engagement parts 222. In this way, the respective magnets 4 are locked by the two locking projections 22 which are positioned at both sides of themselves in the circumferential direction, so the respective magnets 4 are reliably fastened to the rotor core 20 against the centrifugal force accompanying the rotational movement of the rotor 2 and attraction force of the stator 3. As a result, the magnets 4 are prevented from flying off due to the operation of the electric motor 1. Note that the clearances between the overhanging parts 411 which are arranged in the groove-shaped spaces S and engagement parts 222 may be filled with a binding agent. Referring again to FIG. 2, the locking projections 22 according to the present embodiment are formed to extend over the entire lengths of the magnets 4 in a direction parallel to the axis of rotation R. Due to this, the magnets 4 are stably fastened to the rotor core 20. Further, the tip parts of the locking projections 22 according to the present embodiment are positioned inward of the facing surfaces 421 of the magnets 4 in the radial direction. Due to this, even if the curvatures of the facing surfaces 421 of the magnets 4 are small, it is possible to prevent the locking projections 22 from projecting outward of the facing surfaces 421 of the magnets 4 in the radial direction, and interfering with the stator 3.

As explained above, according to the rotor 2 of the present embodiment, the overhanging parts 411 at the inward part 41 of the magnet 4 are locked by the locking projections 22 of the rotor core 20, so the entire facing surface 421 of the magnet 4 faces the inner circumferential surface of the stator 3. Therefore, the locations where short-circuits of magnetic flux occur due to the locking projections 22 are limited to a vicinity of the overhanging parts 411, so it is possible to prevent a decrease in the magnetic flux density from the magnet 4 toward the stator 3, and thus prevent a drop in the output of the electric motor 1. Further, because of the fact that the locations where short-circuits of magnetic flux occur are limited as explained above, it is possible to reduce the amount of useless parts of the magnet 4 which make no contribution to the magnet flux density from the magnet 4 to the stator 3, so the total amount of use of the magnet 4 can be reduced.

Next, the method of production of the rotor 2 of the present embodiment will be explained. The method of production according to the present embodiment includes a core-forming process which forms a rotor core 20 with the above-mentioned structure. In the core-forming process according to the present embodiment, electrical steel sheets are stacked to integrally form a rotor core 20 and plurality of locking projections 22 (see FIG. 5). Further, the method of production according to the present embodiment includes a magnet-forming process which forms a magnet 4 with the above-mentioned structure. In the magnet-forming process according to the present embodiment, first, magnetic powder is pressed to form a pressed powder body, and then the pressed powder body is sintered to form a sintered body. The thus formed sintered body can have a shape generally equal to the magnet 4 (see FIG. 4). Next, the surface of the sintered body is polished by a grindstone so that the sintered body is finished to have the target dimensions. Here, the curved facing surface 421 and the stepped outer end surfaces 43 at the magnet 4 both can be polished by moving grindstones in parallel with the direction of extension of the magnet 4 which is shown by the arrow A40 of FIG. 4. Therefore, in the magnet-forming process according to the present embodiment, grindstones of shapes corresponding to the facing surface 421 and the outer end surfaces 43 can be moved together so as to simultaneously polish the facing surface 421 and the outer end surfaces 43. Due to this, the required time of the magnet-forming process can be shortened.

Further, the method of production according to the present embodiment includes a mounting process for mounting the individual magnets 4 which were formed at the magnet-forming process on the rotor core which was formed in the core-forming process. In the mounting process according to the present embodiment, first the outer circumferential surface 21 of the rotor core 20 is coated with a binding agent. Next, one end part of each overhanging part 411 positioned in the direction of extension of the magnet 4 is inserted into one end part of the space S positioned in direction parallel to the axis of rotation R. Next, the magnet 4 is moved in the direction parallel to the axis of rotation R whereby the other end part of each overhanging part 411 is inserted into the other end part of the space S. The direction of movement of the magnet 4 at this time is shown by the arrow mark A20 of FIG. 2. Consequently, the mounting process of the magnet 4 is ended.

Figure 6:
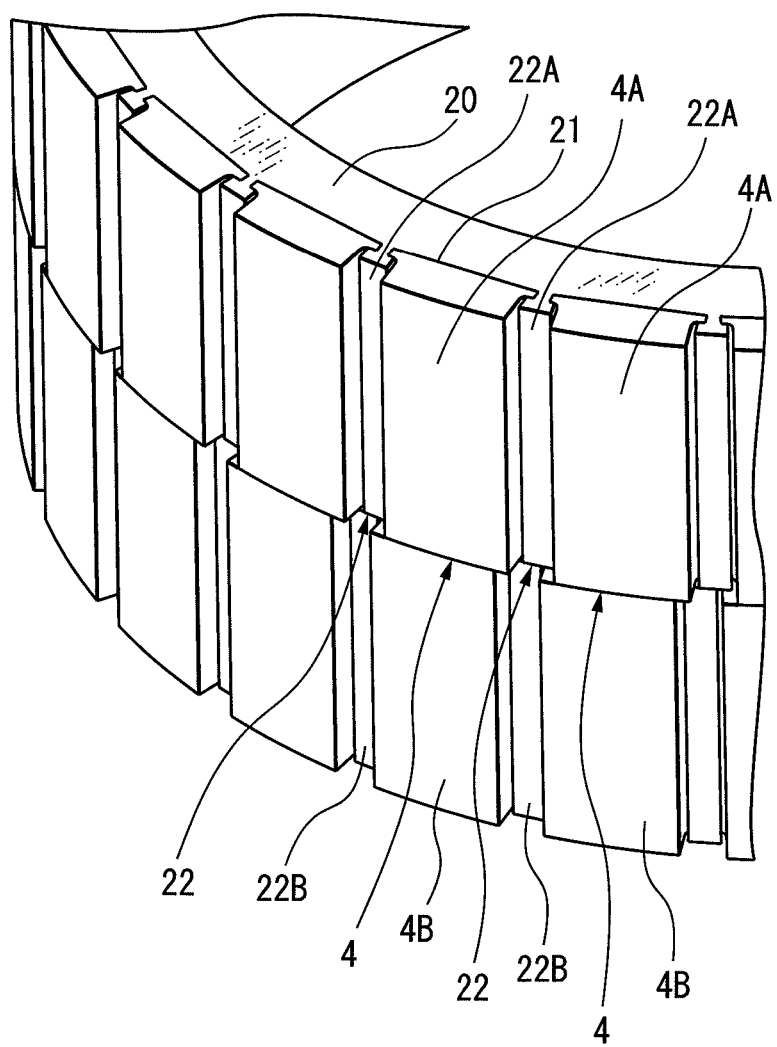
FIG. 6 is a perspective view which shows a modification of the rotor of the first embodiment.

Next, another example of the rotor 2 of the present embodiment will be explained. FIG. 6 is a perspective view of the rotor 2 according to this example. In the rotor 2 according to this example, each magnet 4 is divided into a first part 4A and a second part 4B at a predetermined position in a direction parallel to the axis of rotation R (that is, the vertical direction of FIG. 6). Similarly, each locking projection 22 is divided into first part 22A and a second part 22B at a predetermined position in the direction parallel to the axis of rotation R. By dividing the magnet 4 in the direction parallel to the axis of rotation R in this way, the eddy current generation at the rotor 2 can be reduced during operation of the electric motor 1, so the loss of the electric motor 1 can be lightened. Further, in the rotor 2 of this example, the second part 4B of the magnet 4 is arranged to be offset with respect to the first part 4A in the circumferential direction by a predetermined distance. Similarly, the second part 22B of the locking projection 22 is arranged to be offset with respect to the first part 22A in the circumferential direction by a predetermined distance. Due to such positional offset between the first part 4A and the second part 4B of the magnet 4 in the circumferential direction, the magnetic flux density from the rotor 2 to the stator 3 can be made uniform in the circumferential direction, so the cogging torque of the electric motor 1 can be lightened. The rotor core 20 according to this example can be integrally formed with the first parts 22A and the second parts 22B of the locking projections 22 by stacking electrical steel sheets. Due to this, the above-mentioned arrangement of the first parts 4A and second parts 4B of the magnets 4 can be easily realized.

Next, referring to FIG. 7 to FIG. 10, a second embodiment of the present invention will be explained. The rotor of the present embodiment is configured in a similar way to the rotor of the above-mentioned first embodiment, except for the parts which are explained specifically below. Therefore, the parts with similar configurations to the first embodiment are assigned the same reference notations as the first embodiment, and explanations of these parts are omitted.

Figure 7:
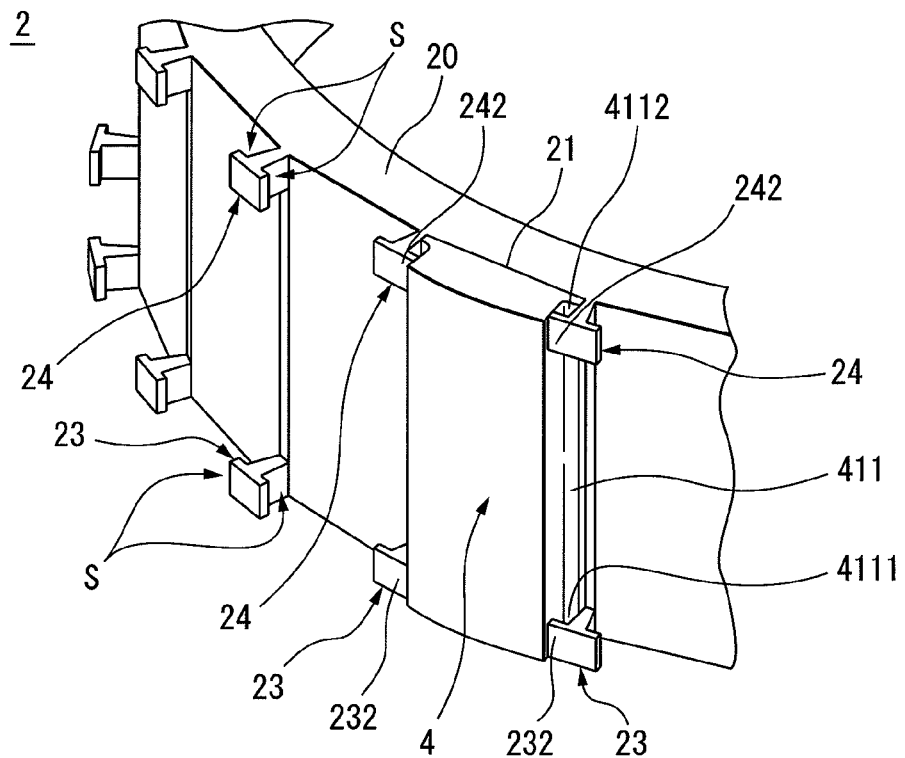
FIG. 7 is a perspective view which shows a state where one magnet is mounted on the rotor core in the rotor of the second embodiment of the present invention.

FIG. 7 is a perspective view of an illustrative rotor 2 of the present embodiment. The rotor core 20 in the rotor 2 of the present embodiment has a plurality of first locking projections 23 and a plurality of second locking projections 24, both of which project outward of the outer circumferential surface 21 in the radial direction so as to lock the plurality of magnets 4. FIG. 7 shows only one magnet 4 which is arranged at the rotor core 20, while the other magnets 4 are omitted. Note that, the magnets 4 at the rotor 2 of the present embodiment are configured in the same way as the magnets 4 of the above-mentioned first embodiment (see FIG. 4). As shown in FIG. 7, the plurality of first locking projections 23 are separated from the plurality of second locking projections 24 in a direction parallel to the axis of rotation R (that is, the vertical direction in FIG. 7), and both of the locking projections 23 and the locking projections 24 are aligned with one another in the circumferential direction. That is, the plurality of first locking projections 23 and the plurality of second locking projections 24 according to the present embodiment are both arranged at equal intervals in the circumferential direction. Further, positions of the first locking projections 23 in the circumferential direction are matched with those of the second locking projections 24. Further, in the rotor 2 according to the present example, the first locking projection 23 locks one end part 4111 of the overhanging part 411 in the direction of extension of the magnet 4, while the second locking projection 24 locks the other end part 4112 of the overhanging part 411 of the magnet 4. Therefore, each magnet 4 is locked by four locking projections which are positioned at its circumference, that is, two first locking projections 23 and two second locking projections 24.

Figure 8:
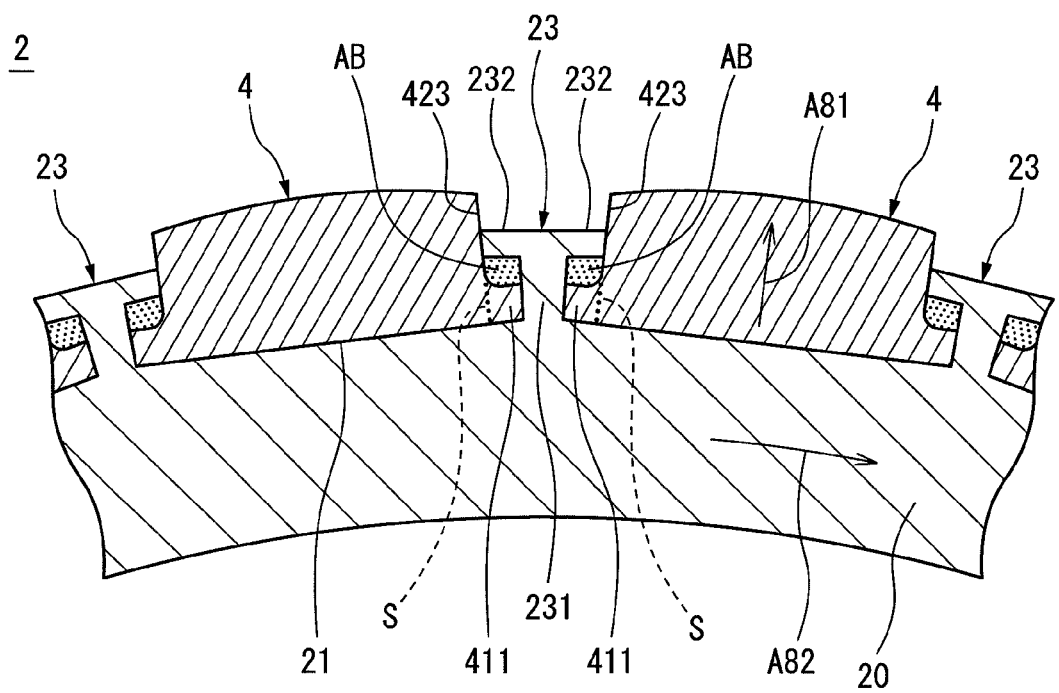
FIG. 8 is a cross-sectional view which shows part of the rotor in the second embodiment enlarged.

FIG. 8 is a cross-sectional view similar to FIG. 3 and shows part of the rotor 2 of FIG. 7 enlarged. In FIG. 8, in the same way as FIG. 3, the radial direction is shown by the arrow mark A81, while the circumferential direction is shown by the arrow mark A82. As shown in FIG. 8, the first locking projections 23 at the rotor 2 of the present embodiment are configured similar to the locking projections 22 in the rotor 2 of the above-mentioned first embodiment. That is, the first locking projections 23 have radially projecting parts 231 which project outward of the outer circumferential surface 21 of the rotor core 20 in the radial direction. Further, the tip part of the radially projecting part 231 is provided with a pair of engagement parts 232, 232 which project outward in the circumferential direction so as to engage with the overhanging parts 411 of the magnets 4. More specifically, the radially projecting part 231 of the first locking projection 23 projects out from the outer circumferential surface 21 of the rotor core 20 in the radial direction so as to pass between the overhanging parts 411 of two adjoining magnets 4. Further, the pair of engagement parts 232, 232 project out toward the side surfaces 423 of two adjoining magnets 4 in the circumferential direction. In this way, the first locking projection 23 according to the present embodiment has a T-shape in the cross-section vertical to the axis of rotation R. The two end parts of the first locking projection 23 in the circumferential direction are provided with groove-shaped spaces S which extend in parallel with the axis of rotation R.

As shown in FIG. 8, in the rotor 2 of the present embodiment, the overhanging parts 411 of the magnet 4 are arranged in the groove-shaped spaces S so as to engage with the engagement parts 232. Further, the dimensions of the groove-shaped spaces S in the radial direction are made larger than the dimensions of the overhanging parts 411 in the radial direction, and the clearances between the overhanging parts 411 which are arranged in the spaces S and the engagement parts 232 are filled with a binding agent AB. In FIG. 7, the binding agent AB is omitted. Note that the second locking projections 24 according to the present example are configured similar to the first locking projections 23, so detailed explanations of the second locking projections 24 are omitted. According to the rotor 2 of the present embodiment which has the above structure, the burden on the worker during the mounting process of the magnet 4 on the rotor core 20 is lightened. This will be explained in detail below.

Figure 9:
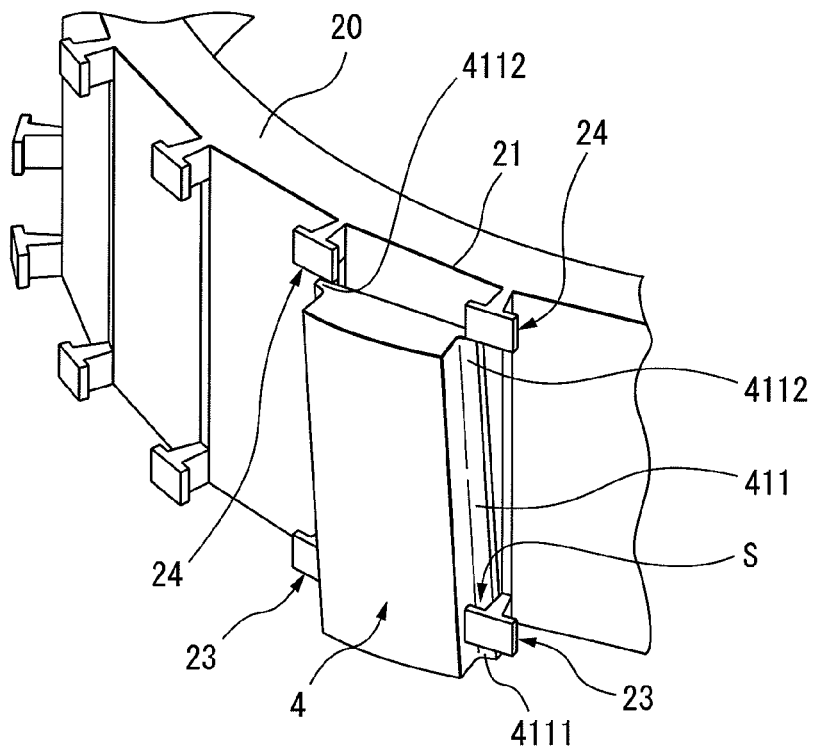
FIG. 9 is a first view for explaining a mounting process in the method of production of a rotor of the second embodiment.
Figure 10:
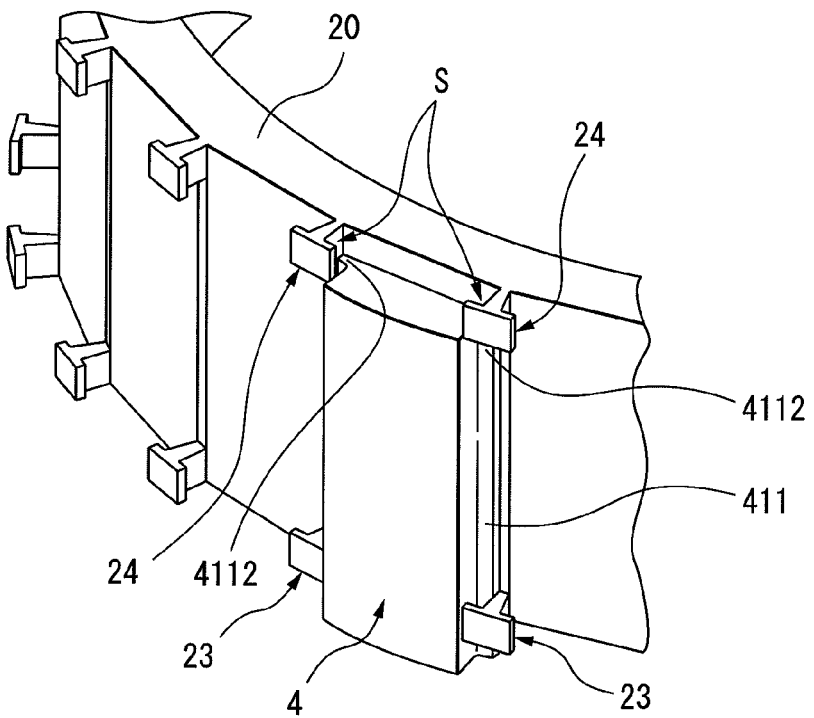
FIG. 10 is a second view for explaining a mounting process in the method of production of a rotor of the second embodiment.

FIG. 9 and FIG. 10 are views for explaining the mounting process of the magnet 4 at the rotor 2 of the present embodiment. As explained in FIG. 9, first, in the mounting process according to the present embodiment, the magnet 4 is slanted with respect to the axis of rotation R (that is, slanted with respect to the vertical direction in FIG. 9) and in that state one end part 4111 of each overhanging part 411 of the magnet 4 is inserted into the space S of the first locking projection 23. As explained above, the dimension of each space S in the radial direction is larger than the dimension of each overhanging part 411 in the radial direction, so in the mounting process according to the present embodiment, the magnet 4 can be inserted into the spaces S in the slanted state. Next, as shown in FIG. 10, the magnet 4 is arranged in parallel to the axis of rotation R. Consequently, the magnet 4 is made to contact the outer circumferential surface 21 of the rotor core 20. Next, the magnet 4 is moved in parallel with the axis of rotation R so that the other end part 4112 of each overhanging part 411 is inserted into the space S of the second locking projection 24 (see FIG. 7).

Here, the magnet 4 and the rotor core 20 are attracted to each other by magnetic force once they are arranged as in FIG. 10. Therefore, it is necessary to apply to the magnet 4 a larger force than the attraction force so as to move the magnet 4 in this state in parallel with the axis of rotation R. However, in the mounting process according to the present embodiment, there is no need for moving the magnet 4 across its entire length. Instead, it is sufficient to move the magnet 4 by the same distance as the length of the end part 4112 of the overhanging part 411, so the load on the worker is lightened and the time required for the mounting process is shortened. Next, the clearance between one end part 4111 of the overhanging part 411 and the locking part 232 of the first locking projection 23 is filled with the binding agent AB, and the clearance between the other end part 4112 of the overhanging part 411 and the second locking projection 24 is also filled with the binding agent AB (see FIG. 8). Consequently, the mounting process is ended. Note that, the process of forming the core and the process of forming the magnet of the rotor 2 of the present embodiment are similar to those of the above-mentioned first embodiment.

EFFECT OF INVENTION

According to the first and sixth aspects of the present invention, the overhanging parts at the inward part of the magnet are locked by the locking projections of the rotor core, so the outward part of the magnet as a whole faces the inner circumferential surface of the stator. Therefore, according to the first and sixth aspects, it is possible to prevent a decrease in the magnetic flux density from the magnet to the stator and thus prevent a drop in output of the electric motor.

According to the second and sixth aspects of the present invention, the locking projections are formed to extend across the entire length of the rotor core, so the magnet can be stably fastened to the rotor core.

According to the third, sixth, and seventh aspects of the present invention, in the mounting process of the magnet, the distance for moving the magnet against the attraction force is shortened, so the load on the worker during the mounting process of the magnet can be lightened.

According to the fourth and sixth aspects of the present invention, even when clearances are formed between the overhanging parts of the magnet and the locking projections, the magnet can be stably fastened by the binding agent to the rotor core.

According to the fifth and sixth aspects of the present invention, the tip parts of the locking projections are positioned inward of the facing surfaces of the magnets in the radial direction, so the locking projections can be prevented from interfering with the stator.

The present invention is not limited to only the above embodiments and can be modified in various ways in the range described in the claims. Further, the dimensions, shapes, materials, etc. of the above-mentioned parts are only examples. Various dimensions, shapes, materials, etc. can be employed for achieving the effects of the present invention.

The invention claimed is:

1. A method of production of a rotor of an electric motor, said rotor comprising a cylindrically shaped rotor core, and a plurality of magnets which are arranged at predetermined intervals at an outer circumferential surface of said rotor core, wherein each of said plurality of magnets has an inward part which adjoins said rotor core and an outward part which is positioned outward of said inward part in a radial direction of said rotor core, said outward part has a facing surface which faces a stator of the electric motor, and a pair of side surfaces which extend from two end parts of said facing surface in a circumferential direction of said rotor core toward said inward part, said inward part has a pair of overhanging parts which overhang outward in said circumferential direction with respect to said pair of side surfaces of said outward part, said rotor core has a plurality of locking projections which are formed at said outer circumferential surface so as to lock said plurality of magnets, and each of said plurality of locking projections has a radially projecting part which passes between said overhanging parts of two adjoining magnets and projects outward in said radial direction to engage with said overhanging parts, wherein said rotor core has first locking projections which are aligned with one another, and second locking projections which are aligned with one another and separated from the first locking projections in a direction parallel to the axis of rotation of said rotor core, as said locking projections, and one end part of said overhanging part in a direction parallel to said axis of rotation is locked by said first locking projection, and the other end part of said overhanging part is locked by said second locking projection, the method of production of the rotor comprising:

slanting said magnet with respect to said axis of rotation and in that state inserting one end part of said overhanging part of said magnet in a space between said first locking projection and said outer circumferential surface of said rotor core, arranging said magnet in parallel with said axis of rotation so that at least a portion of the inward part of the magnet is in contact with the outer circumferential surface of said rotor core, moving the magnet in a direction parallel with the axis of rotation and inserting the other end part of said overhanging part of said magnet in a space between said second locking projection and said outer circumferential surface of said rotor core, and filling a binding agent in clearances between said overhanging part of said magnet, and said first and second locking projections.

* * * * *